US008567305B2

(12) United States Patent
Bregman

(10) Patent No.: US 8,567,305 B2
(45) Date of Patent: Oct. 29, 2013

(54) PORTABLE BEVERAGE AERATION DEVICE

(76) Inventor: David B. Bregman, Clarksburg, NJ (US)

( * ) Notice: Subject to any disclaimer, the term of this patent is extended or adjusted under 35 U.S.C. 154(b) by 365 days.

(21) Appl. No.: 12/940,554

(22) Filed: Nov. 5, 2010

(65) Prior Publication Data

US 2012/0111202 A1 May 10, 2012

(51) Int. Cl.
*A23L 2/54* (2006.01)

(52) U.S. Cl.
USPC .. 99/323.2; 99/323.1; 261/122.1; 261/DIG. 7

(58) Field of Classification Search
USPC .............. 99/323.1, 323.2; 261/122.1, DIG. 7; 426/477
See application file for complete search history.

(56) References Cited

U.S. PATENT DOCUMENTS

| | | | | |
|---|---|---|---|---|
| 4,494,452 | A * | 1/1985 | Barzso | 99/323.1 |
| 4,526,730 | A * | 7/1985 | Cochran et al. | 261/121.1 |
| 5,154,112 | A * | 10/1992 | Wettern | 99/323.1 |
| 5,595,104 | A * | 1/1997 | Delaplaine | 99/323.1 |
| 5,885,467 | A | 3/1999 | Zelenak et al. | |
| 6,270,059 | B1 | 8/2001 | Kurzer et al. | |
| 6,652,893 | B2 | 11/2003 | Berson | |
| 6,821,438 | B2 | 11/2004 | Hadley et al. | |
| 8,205,541 | B2 * | 6/2012 | Barberio et al. | 99/277.1 |
| 2010/0006603 | A1 * | 1/2010 | Weinberg et al. | 222/152 |
| 2010/0058933 | A1 * | 3/2010 | Cheng | 99/323.1 |

* cited by examiner

*Primary Examiner* — Henry Yuen
*Assistant Examiner* — John J Norton
(74) *Attorney, Agent, or Firm* — Dale J. Ream

(57) ABSTRACT

A portable aeration device includes a housing having an air chamber in communication with an ambient air source, a supply area, a valve restricting airflow between the air chamber and ambient air source, and a valve restricting airflow between the chamber and supply area. The housing defines an exit in communication with the supply area, the aeration device having a cap selectively covering the housing exit. The aeration device includes a diffuser having a plurality of openings, an output tube extending from the diffuser to a location in communication with the supply area to alternately supply air from the supply area to the diffuser and allow liquid to pass from the diffuser to the supply area. A pump is in communication with the air chamber to force air from the air chamber to the supply area. The aeration device includes a fastener for attaching the housing to a water bottle.

8 Claims, 4 Drawing Sheets

PORTABLE BEVERAGE AERATION DEVICE

BACKGROUND OF THE INVENTION

This invention relates generally to aeration devices and, more particularly, to a portable beverage aeration device for injecting air into a bottled water product so as to enhance the flavor and freshness thereof.

Consumers purchase bottled water for several reasons, including a perception of enhanced health attributes and, in some cases, for enhanced taste reasons. However, enhanced taste concerns may be significantly dependent on water purification standards or facilities of a local municipality and may be highly debatable amongst consumers. In fact, some consumers prefer the taste of water generated by high quality water fountains due to the fact that the water fountain water may have more air infused into the water than in bottled water.

Various devices have been proposed in the art for infusing air into beverages, namely, commercial carbonation systems. Although assumably effective for their intended purposes, the existing devices are typically not feasible for operation by individual consumers to inject a selected volume or pressure of air directly into a single bottled water product.

Therefore, it would be desirable to have a portable beverage aeration device for injecting a variable amount of air into a single bottle of water so as to enhance its taste and freshness. Further, it would be desirable to have a portable beverage aeration device having a configuration for mounting atop a bottled water product and selectively pumped by a user. In addition, it would be desirable to have a portable beverage aeration device having safety measures to avoid injecting too much air into a bottled water product that may cause rupture thereof.

SUMMARY OF THE INVENTION

A portable aeration device according to the present invention includes a housing having an air chamber in communication with an ambient air source, a supply area, a valve restricting airflow between the air chamber and ambient air source, and a valve restricting airflow between the chamber and supply area. The housing defines an exit in communication with the supply area, the aeration device having a cap selectively covering the housing exit. The aeration device includes a diffuser having a plurality of openings, an output tube extending from the diffuser to a location in communication with the supply area to alternately supply air from the supply area to the diffuser and allow liquid to pass from the diffuser to the supply area. A pump is in communication with the air chamber to force air from the air chamber to the supply area. The aeration device includes a fastener for attaching the housing to a water bottle.

Therefore, a general object of this invention is to provide a portable beverage aeration device for infusing air into an individual bottle of water so as to enhance taste and freshness.

Another object of this invention is to provide a portable beverage aeration device, as aforesaid, that is self-contained for home use and may be easily attached to and removed from a bottle of water.

Still another object of this invention is to provide a portable beverage aeration device, as aforesaid, having a valve that prevents unintentional over-pressurization of a water bottle.

Yet another object of this invention is to provide a portable beverage aeration device, as aforesaid, that includes a hand-pump that is easy to use by a consumer.

A further object of this invention is to provide a portable beverage aeration device, as aforesaid, that can dispense water without completely removing the device from a water bottle.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1A:
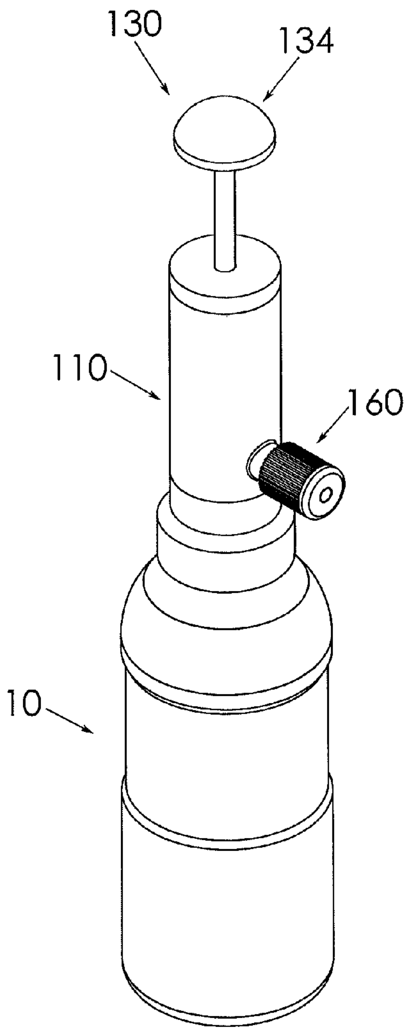
FIG. 1*a* is a perspective view of a portable beverage aeration device coupled to a first water bottle according to a preferred embodiment of the present invention.

Portable beverage aeration devices according to the present invention will now be described in detail with reference to FIGS. 1 through 4*b* of the accompanying drawings. More particularly, a portable beverage aeration device 100 according to one embodiment includes a housing 110, a pump 130, a diffuser 140, and a fastener portion 150.

Figure 3A:
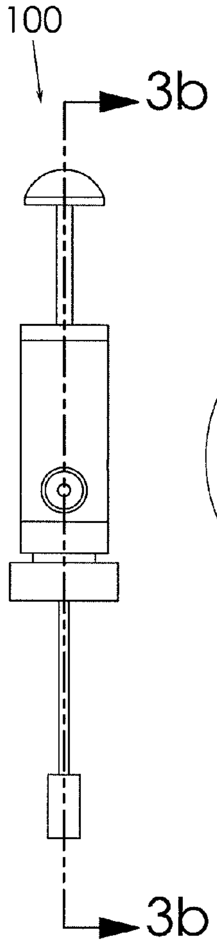
FIG. 3*a* is a side view of the aeration device as in FIG. 1.
Figure 3B:
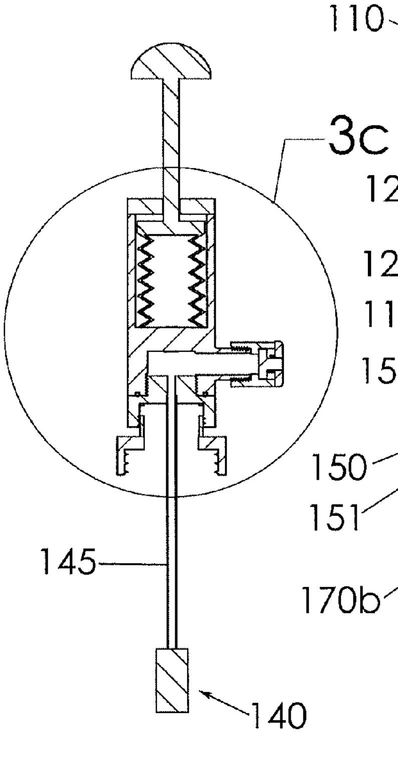
FIG. 3*b* is a sectional view taken along line 3*b*-3*b* of FIG. 3*a;*
Figure 3C:
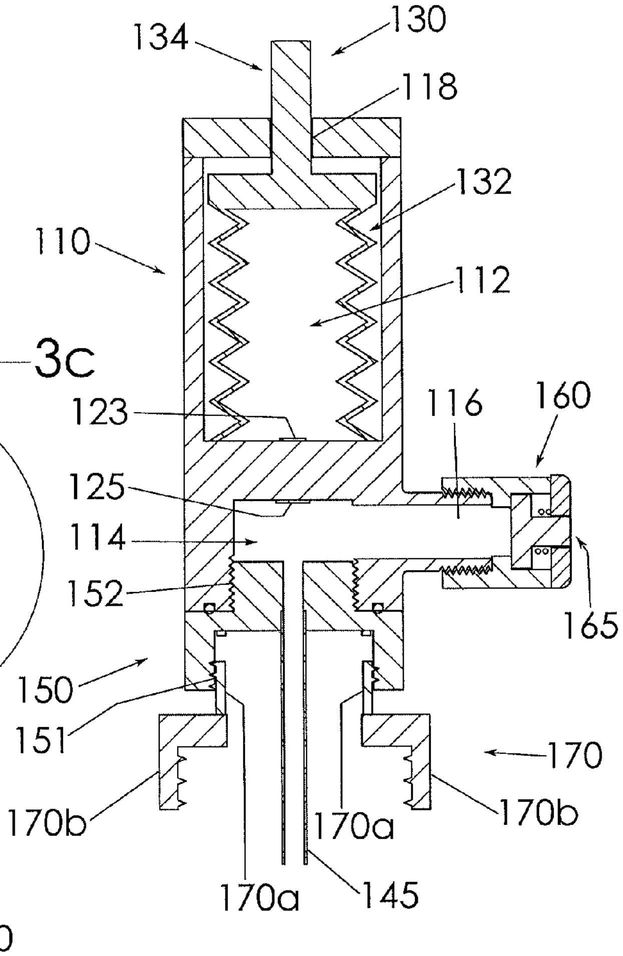
FIG. 3*c* is an isolated view on an enlarged scale taken from FIG. 3*b;*

The housing 110, shown throughout the drawings, has an air chamber 112 (FIGS. 3*c* and 4*b*) and a supply area 114 (FIGS. 3*c* and 4*b*) separated from the air chamber 112. One passage 113 (FIG. 4*b*) extends from the air chamber 112 to an ambient air source outside the housing 110, and another passage 115 extends from the air chamber 112 to the supply area 114. An exit 116 is in communication with the supply area 114, though the exit 116 may be selectively covered by a cap 160 (discussed below) as shown in FIG. 3*c*. The housing 110 may be constructed of plastic, metal, ceramics, composites, and/or any other appropriate materials. It may be particularly desirable to use materials that may be easily sanitized, and that are generally non-aromatic.

A valve 123 (FIGS. 2, 3*c*, and 4*b*) restricts air flow between the air chamber 112 and the ambient air source through the passage 113, and another valve 125 (FIGS. 2, 3*c*, and 4*b*) restricts air flow between the air chamber 112 and the supply area 114 through the passage 115. More particularly, the valve 123 may be a one-way valve that generally allows air to flow from the ambient air source to the air chamber 112 through the passage 113, and generally prevents air from flowing from the air chamber 112 to the ambient air source through the passage 113; and the valve 125 may be a one-way valve that generally allows air to flow from the air chamber 112 to the supply area 114 through the passage 115, and generally prevents air and liquid from flowing from the supply area 114 to the air chamber 112 through the passage 115. Diaphragm or "flap" valves are shown in the drawings, though other valves may alternately be used.

Figure 4A:
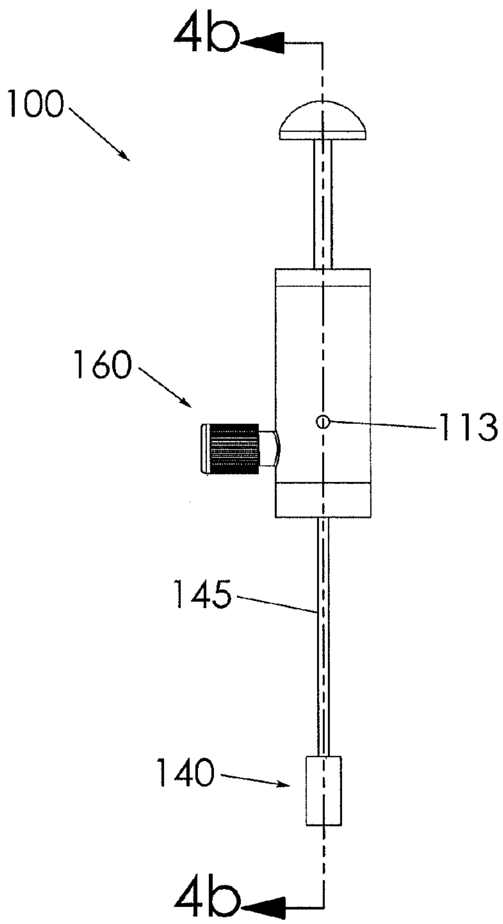
FIG. 4*a* is a side view of the aeration device of FIG. 1 from another angle.
Figure 4B:
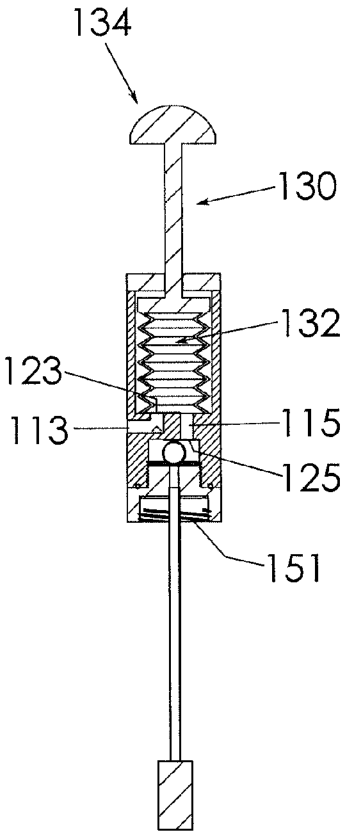
FIG. 4*b* is a sectional view taken along line 4*b*-4*b* of FIG. 4*a*.

The pump 130 is best shown in FIGS. 3*c* and 4*b*, and is in communication with the air chamber 112 to force air from the air chamber 112 to the supply area 114. Though various types of pumps may be used, it may be desirable for the pump 130 to be a bellow pump having a bellow portion 132 inside the air chamber 112 and a handle portion 134 extending outside the housing 110. As shown in FIG. 3*c*, the handle portion 134 may pass through an opening 118 in the housing 110. Seals, bearings, lubricants, and other apparatus may interact with the handle portion 134 inside the opening 118 if desired, as will be appreciated by those skilled in the art. However, any such apparatus should be selected to provide minimal or preferably no noticeable effect on the purity of air passed through the passage 113 to the air chamber 112, and from the air chamber 112 to the supply area 114.

A diffuser 140 (FIG. 2) has a plurality of openings (not shown), and an output tube 145 (FIGS. 2, 3*b*, and 3*c*) extends from the diffuser 140 to a location in communication with the supply area 114 to alternately supply air from the supply area 114 to the diffuser 140 and allow liquid to pass from the diffuser 140 to the supply area 114, as discussed below. As with the housing 110, the diffuser 140 and the output tube 145 may preferably be constructed of materials that are easily sanitized and generally non-aromatic. While the output tube 145 may be rigid, it may be desirable for the output tube 145 to instead be flexible. In addition, the output tube may be removably coupled to the fastener portion 150 proximate the supply area 114, such as by threads (not shown) or a friction fit engagement (FIG. 3*c*) so as to enable liquid to flow more freely from the beverage container 10 to the supply area 114, as will be discussed further below.

As shown in FIG. 3*c*, the fastener portion 150 is configured (e.g., with threading 151) to removably couple the housing 110 to a beverage container 10 (e.g., a bottle having threading complementary to the threading 151) such that the diffuser 140 is positioned in the beverage container 10 when the housing 110 is coupled to the beverage container 10, and the output tube 145 may be coupled to the fastener portion 150. The fastener portion 150 may be removably coupled to the housing 110 (e.g., by threading 152), which may aid in cleaning. In addition, the outer tube 145 may itself be removably coupled to fastener portion 150 such that the outer tube 145 and diffuser 140 may be selectively removed from the housing 110. For instance, a user may choose to remove the diffuser 140 and outer tube 145 after water in a bottle 10 has been aerated so as to allow water from the bottle to pass more easily into the supply area 114 and through the exit 116 when the cap 160 is removed.

Further, to allow the housing 110 to be coupled to different types of beverage containers (e.g., bottles having different types of threading), alternate fastener portions may be coupled to the housing 110 (e.g., by threading similar to the threading 152) when the fastener portion 150 is separated from the housing 110, and the alternate fastener portions may include threading that is complementary to threading of different types of beverage containers.

Figure 1B:
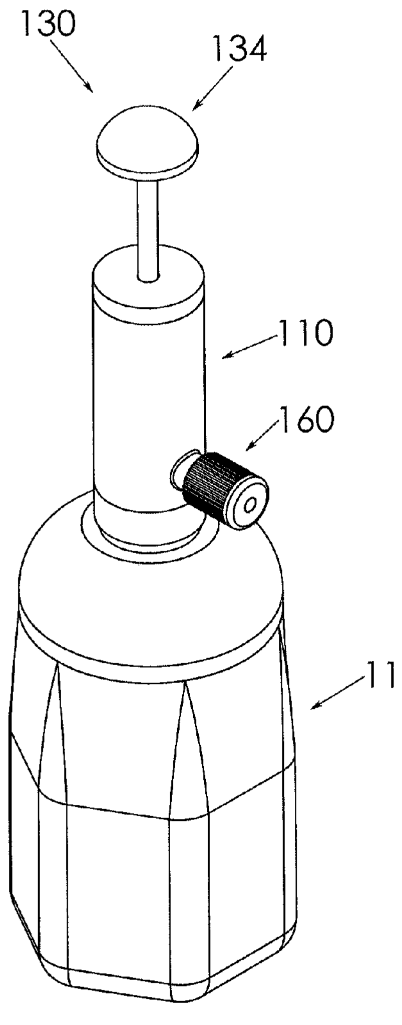
FIG. 1*b* is a perspective view of the aeration device coupled to a second water bottle.
Figure 2:
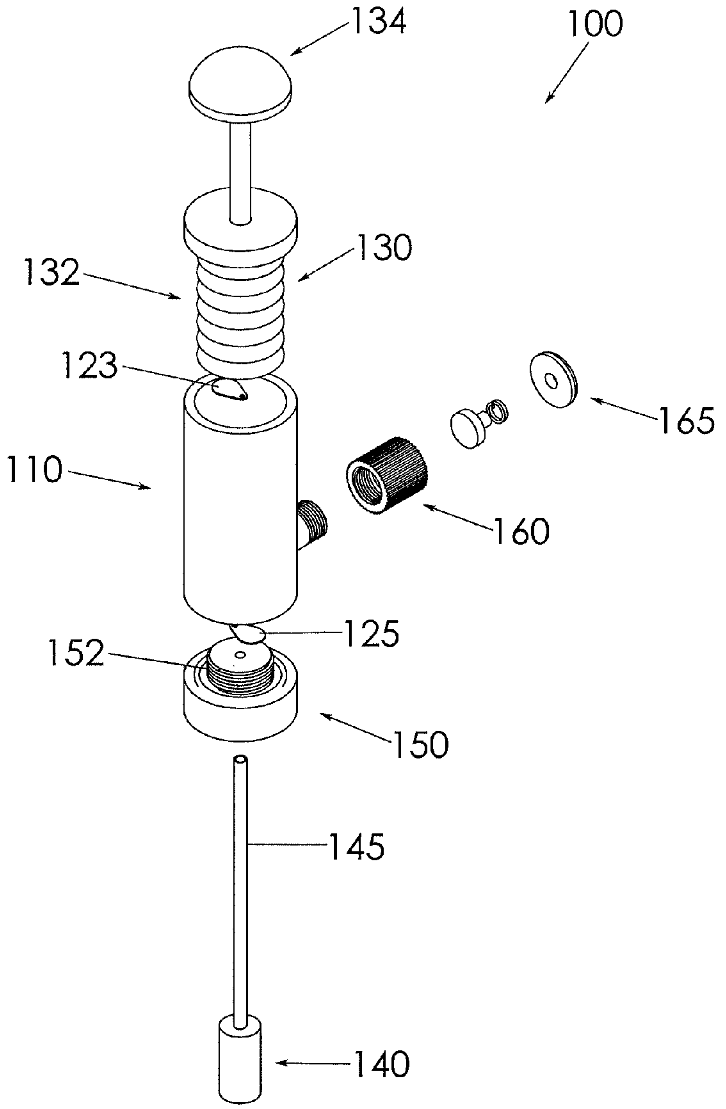
FIG. 2 is an exploded view of the aeration device as in FIG. 1.

Alternately, or in addition to the alternate fastener portions, adapters 170 may be included. Each adapter 170 may have a first section 170*a* that has threading complementary to the threading 151 to attach the adapter to the fastener portion 150 when the fastener portion 150 is not connected to a beverage container, and a second section 170*b* that has threading that is complementary to threading of different types of beverage containers. FIG. 1*b* illustrates a fastener portion 150 with an adapter 170 coupled thereto so that the entire housing 110 may be coupled to a second beverage container 11 having a different configuration than the beverage container 10 shown in FIG. 1*a*. Those skilled in the art will appreciate that, while the alternate fastener portions and the adapters may allow the housing 110 to function with different types of beverage containers (such as 10 and 11), aeration devices without that added functionality may nevertheless be desirable.

When the fastener portion 150 couples the housing 110 to the beverage container, the output tube 145 and the diffuser 140 are the only path between the supply area 114 and the beverage container. Accordingly, when pressure in the beverage container and the supply area 114 is increased by the pump 130 (as described in more detail below), it could be possible for an unsafe rupturing of the bottle to result. To prevent such an occurrence, a safety valve 165 may be included to prevent an undesirable buildup of pressure in the supply area 114. As shown in FIG. 3*c*, the cap 160 may include the safety valve 165. While the safety valve 165 may alternately be separate from the cap 160, it may nevertheless be very desirable for the safety valve 165 to be in communication with the supply area 114 at least when the cap 160 covers the housing exit 116. Structures for safety valves are well known, as will be apparent to those skilled in the art.

In use, the bottle 10 contains a beverage (e.g., water, a sports drink, etc.) and is generally provided in a sealed state with a cap. The beverage is exposed by removing the cap, and the fastener portion 150 (and specifically the threading 151, for example) is used to couple the housing 110 to the bottle 10 such that the diffuser 140 is positioned inside the liquid in the bottle 10. The pump 130 is then operated to aerate the beverage in the bottle 10. Specifically, ambient air is drawn through the passage 113 into the air chamber 112, and the pump 130 forces air from the air chamber 112 to the supply area 114 (e.g., by pushing the handle portion 134 and compressing the bellow portion 132). The valves 123, 125 ensure that the air moves in this manner, instead of in a reverse direction, as described above. Due to pressure differential, air from the supply area 114 travels through the output tube 145, into the diffuser 140, and out into the beverage—effectively aerating the beverage. If an undesirable amount of pressure builds inside the bottle 10 and the supply area 114, the safety valve 165 may release pressure. To serve the aerated beverage, the cap 160 may be removed, and the beverage may be poured through the diffuser 140 and the output tube 145, and out of the supply area 114 through the exit 116; or, the outer tube 145 and diffuser 140 may be removed from engagement with the supply area 114, as described above, so that the beverage may more freely flow through the supply area 114 to the exit 116. Alternatively, the housing 110 may be separated from the bottle 10, and the beverage may be poured in a conventional manner. To use the housing 110 with bottles having different closure configurations (e.g., different types of threading), the alternate fastener portions and adapters may be used, as set forth above.

The beverage aeration device disclosed herein also contemplates a reusable water bottle having an aeration pump built in to its construction. For instance, it was described above that housing 110 includes structures enabling it to be removably coupled to a water bottle 10 and then to remove the housing 110 after operating the pump 130 to aerate water in the bottle 10. In other words, the housing 110 may be permanently attached to a reusable beverage container.

It is understood that while certain forms of this invention have been illustrated and described, it is not limited thereto except insofar as such limitations are included in the following claims and allowable functional equivalents thereof.

The invention claimed is:

1. A portable beverage aeration device for use with a first beverage container, comprising:

a housing having an air chamber, a first passage extending from said air chamber to an ambient air source outside said housing, a supply area separated from said air chamber, a second passage in fluid communication between said air chamber and said supply area, and an exit in communication with said supply area;

a first one-way valve generally allowing air to flow from said ambient air source to said air chamber through said first passage and generally preventing air from flowing from said air chamber to said ambient air source through said first passage;

a second one-way valve generally allowing air to flow from said air chamber to said supply area through said second passage and generally preventing air and liquid from flowing from said supply area to said air chamber through said second passage;

a cap selectively covering said housing exit;

a safety valve situated in said supply area proximate said housing exit when said cap covers said housing exit, said safety valve configured to prevent an undesirable buildup of pressure in said supply area;

a diffuser having a plurality of openings;

an output tube extending from said diffuser to a location in communication with said supply area to alternately supply air from said supply area to said diffuser and allow liquid to pass from said diffuser to said supply area;

a pump in communication with said air chamber configured to force air from said air chamber to said supply area;

a fastener portion configured to removably couple said housing to a beverage container such that said diffuser is positioned in said beverage container when said housing is coupled to the first beverage container;

wherein:

said fastener portion includes threading complementary to threading of said beverage container for coupling said housing to the beverage container;

said output tube is coupled to said fastener portion; and said output tube and said diffuser are the only path between said supply area and the first beverage container when said housing is coupled to the first beverage container.

2. The device of claim 1, wherein said pump is a bellow pump having a bellow portion inside said air chamber and a handle portion extending outside said housing.

3. The device of claim 1, wherein said cap includes said safety valve.

4. The device of claim 3, wherein said fastener portion includes threading complementary to threading of the first beverage container for coupling said housing to the first beverage container.

5. The device of claim 4, wherein:

said output tube is coupled to said fastener portion; and said output tube and said diffuser are the only path between said supply area and the first beverage container when said housing is coupled to the first beverage container.

6. The device of claim 5, further comprising an adapter having first and second sections, said first section having threading complementary to said fastener portion threading to attach said adapter to said fastener portion when said fastener portion is separated from the first beverage container, said second section having threading complementary to threading of a second beverage container to attach said adapter to said second beverage container, said second beverage container threading being different from the first beverage container threading.

7. The device of claim 1, further comprising an adapter having first and second sections, and wherein:

said fastener portion includes threading complementary to threading of said beverage container for coupling said housing to the first beverage container;

said first adapter section has threading complementary to said fastener portion threading to attach said adapter to said fastener portion when said fastener portion is separated from the first beverage container;

said second section has threading complementary to threading of a second beverage container to attach said adapter to said second beverage container; and said second beverage container threading is different from said beverage container threading.

8. The device of claim 7, wherein said cap includes a safety valve in communication with said supply area when said cap covers said housing exit.

* * * * *